United States Patent
Warren et al.

(10) Patent No.: US 9,407,452 B2
(45) Date of Patent: Aug. 2, 2016

(54) SYSTEM COMPONENT INSTALLATION

(71) Applicant: Vivint, Inc., Provo, UT (US)

(72) Inventors: Jeremy B. Warren, Draper, UT (US); Jeffrey G. Thomas, Draper, UT (US); Michael D. Child, Lehi, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/209,006

(22) Filed: Mar. 13, 2014

(65) Prior Publication Data

US 2014/0263612 A1    Sep. 18, 2014

Related U.S. Application Data

(60) Provisional application No. 61/787,128, filed on Mar. 15, 2013.

(51) Int. Cl.
*G06K 7/10* (2006.01)
*H04L 12/28* (2006.01)
*G06F 9/445* (2006.01)

(52) U.S. Cl.
CPC ........ *H04L 12/2809* (2013.01); *H04L 12/2807* (2013.01); *G06F 8/61* (2013.01); *G06F 9/44505* (2013.01)

(58) Field of Classification Search
CPC .. G06Q 10/08; G06Q 10/087; H04L 12/2809; H04L 12/2807; G06F 8/61; G06F 9/44505
USPC .............................. 235/375, 385, 454, 462.13
See application file for complete search history.

(56) References Cited

U.S. PATENT DOCUMENTS

| | | | | |
|---|---|---|---|---|
| 5,519,878 | A  * | 5/1996 | Dolin, Jr. ...................... | 709/220 |
| 6,742,705 | B1 * | 6/2004 | Clark ............................ | 235/385 |
| 7,069,345 | B2 * | 6/2006 | Shteyn ......................... | 709/250 |
| 7,119,658 | B2 * | 10/2006 | Stilp ............................ | 340/5.61 |
| 7,685,026 | B1 * | 3/2010 | McGrady et al. ............... | 705/28 |
| 8,250,163 | B2 | 8/2012 | Castaldo et al. | |
| 8,478,844 | B2 | 7/2013 | Baum et al. | |
| 8,893,968 | B2 * | 11/2014 | Jonsson ....................... | 235/385 |
| 2002/0169914 | A1 * | 11/2002 | Shteyn ......................... | 710/305 |
| 2004/0160306 | A1 * | 8/2004 | Stilp ............................ | 340/5.61 |
| 2012/0312874 | A1 * | 12/2012 | Jonsson ....................... | 235/385 |

\* cited by examiner

*Primary Examiner* — Paultep Savusdiphol
(74) *Attorney, Agent, or Firm* — Holland & Hart LLP

(57) ABSTRACT

A computer-implemented method for installing a component within a system is described. In one embodiment, component information is identified via a component code on a component. User input is received that includes additional component information. A component associated with the component code is activated in a system based on the component information and the additional component information.

20 Claims, 5 Drawing Sheets

SYSTEM COMPONENT INSTALLATION

CROSS-REFERENCE TO RELATED APPLICATIONS

The present Application claims priority to U.S. Provisional Patent Application No. 61/787,128, titled: "System Component Installation," filed on Mar. 15, 2013, and assigned to the assignee hereof.

TECHNICAL FIELD

This disclosure relates generally to component installation and, more specifically, to component installation within a system, such as, for example only, a home automation system, a security system, or a combination thereof.

BACKGROUND

Advancements in media delivery systems and media-related technologies continues to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many businesses use one or more computer networks to deliver media between the various computers connected to the networks. Users of computer technologies continue to demand increased access to media and an increase in the efficiency of these technologies. Improving the efficiency of computer technologies is always desirable to anyone who uses and relies on computers.

With the wide-spread use of computers and mobile devices has come an increased presence of home automation and home security products. Advancements in home automation allow users to control aspects of their home and/or business using mobile computing devices. However, current implementations of installing components in a home automation system involve complicated steps. As a result, benefits may be realized by simplifying the installation of components in an automation/security system.

SUMMARY

According to at least one embodiment, a computer-implemented method for installing a component within a system is described. In one embodiment, component information may be identified via a component code on a component. In some cases, the component information may include at least one of component identification information, component type information, component settings information, component specification information, and component location information. In some cases, user input may be received that includes additional component information. A component associated with the component code may be activated in a system based on the component information and the additional component information. In some embodiments, the component may be activated in a security system, an automation system, or a combination thereof.

In some embodiments, a system controller may store the component information received. The stored component information may include the additional component information. In some cases, the component information may be stored locally on a storage device at the system controller. Additionally, or alternatively, the component information may be stored remotely on a storage device separate from the system controller such as in cloud storage, on another computing device, etc. In one embodiment, a first component may be replaced with a second component based on the stored component information. For example, information identifying the first component, the type of the first component, and/or the location of the first component may be provided to enable a user to replace the first component with the second component.

In one embodiment, the component code may be scanned via a scanner to receive at least a portion of the component information. In some embodiments, the component code is scanned via a camera on a mobile computing device (e.g., scanning the component code via a camera on a smart phone, etc.). In some cases, the scanner is incorporated into a system controller. The additional component information may be received via the system controller. In some cases, at least a portion of the additional component information may be entered by a user at the system controller. Additionally, or alternatively, at least a portion of the additional component information may be sent to the system controller from a separate computing device. For example, a user may enter at least a portion of the additional component information via a computing device (e.g., smart phone, tablet device, laptop, desktop, etc.) that communicates the entered information to the system controller.

In one embodiment, the system controller may identify component location information included in the additional component information. In some cases, the system controller may display a list of available locations for the component. The user may select a location from the list of available locations, and the system controller may receive a user selection from the list of available locations. In some cases, the list of available locations may be displayed directly on the system controller. In some cases, the list of available locations may be displayed on a separate computing device. For example, the list may be displayed on the user's smart phone. The user may select a location using the smart phone, and the user selection may be communicated to the system controller via the smart phone.

A computing device configured to obscure content on a screen is also described. The device may include a processor and memory in electronic communication with the processor. The memory may store instructions that may be executable by the processor to identify component information via a component code on a component, receive user input including additional component information, and activate a component associated with the component code in a system based on the component information and the additional component information.

A computer-program product to obscure content on a screen is also described. The computer-program product may include a non-transitory computer-readable medium that stores instructions. The instructions may be executable by the processor to identify component information via a component code on a component, receive user input including additional component information, and activate a component associated with the component code in a system based on the component information and the additional component information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

Figure 1:
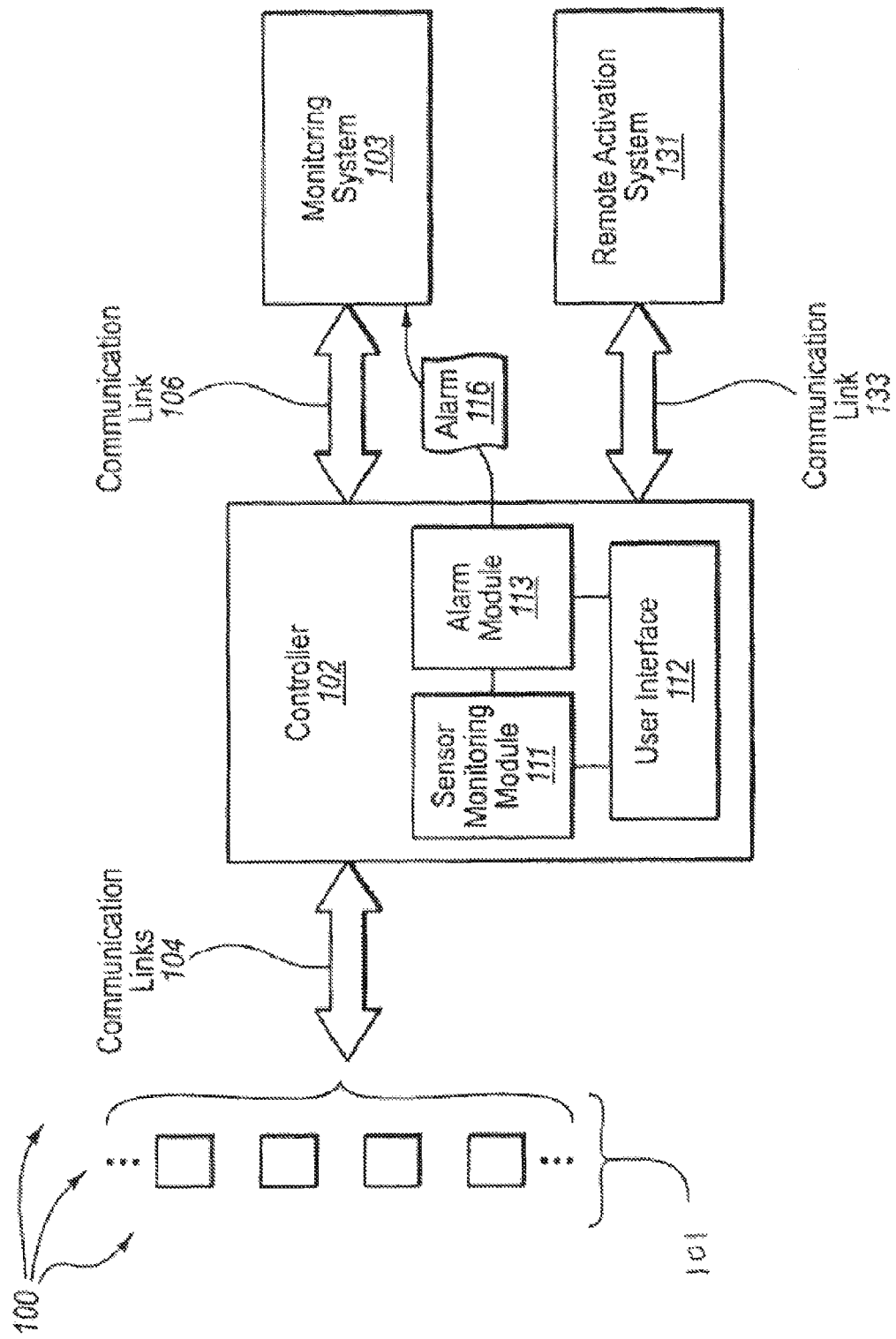
FIG. 1 is a block diagram of a system, according to an embodiment of the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

One embodiment of the present systems and methods may comprise a system controller. The system controller may include a scanner (e.g., an optical scanner) to scan a component code (e.g., bar code, QR code, holographic code, etc.) of a component for component information. Further, the system controller may include a processor for processing the component information to install the component within a system. By way of example, the system may comprise a security system, an automation system, or a combination thereof, and the component may comprise an input device (e.g., a sensor) and/or an output device (e.g., a light). According to various embodiments of the present systems and methods, a component may be installed within a system while the system is being originally installed, or to replace or add a component within a previously installed system.

Another embodiment of the present systems and methods may include a system controller comprising an electronic reader configured to scan a barcode of a component for component information. The system controller may further include a user interface for receiving other component information, such as component location information (e.g., the physical location wherein the component will be installed, etc.), component identification information, component type information, component settings information, component specification information, and the like. Moreover, the system controller may include a processor to process the component information and the component location information to install the component in a system.

Another embodiment of the present systems and methods may comprise a method for installing a component in a system. The method comprises receiving component information from a component code of a component. The method may also include installing the component in the system based at least partially on the component information.

In accordance with another embodiment of the present systems and methods, a method of installing a component within a system may include scanning a barcode of a component at a system controller. The method may further include entering a location description for the component at the system controller. Further, the method may include positioning the component at a location corresponding to the location description.

In yet another embodiment of the present systems and methods, a method for installing a sensor within a system includes receiving component information via a component code. The method may also include receiving user input including additional component information. In addition, the method may include activating a component associated with the component code in a system based on the component information and the additional component information.

Yet another embodiment of the present systems and methods includes computer-readable medium having computer-executable instructions thereon for performing the methods described herein.

Other aspects, as well as features and advantages of various aspects, of the present systems and methods will become apparent to those of skill in the art though consideration of the ensuing description, the accompanying drawings and the appended claims.

Referring in general to the accompanying drawings, various embodiments of the present systems and methods are illustrated to show the structure and methods for installing a component within a system, such as a security system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments described herein.

The following provides a more detailed description of the present systems and methods and various representative embodiments thereof. In this description, functions may be shown in block diagram form in order not to obscure the present systems and methods in unnecessary detail. Additionally, block definitions and partitioning of logic between various blocks is exemplary of a specific implementation. It will be readily apparent to one of ordinary skill in the art that the present systems and methods may be practiced by numerous other partitioning solutions. For the most part, details concerning timing considerations and the like have been omitted where such details are not necessary to obtain a complete understanding of the present systems and methods and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

It is noted that, according to various embodiments of the present invention, a system may include a home automation system, a security system, or a combination thereof. It is further noted that a security system may be referred herein as an "alarm system."

According to various embodiments of the present invention, a system control panel (e.g., a primary control panel), which may also be referred to herein as a "controller" or a "system controller," may include a barcode reader configured to scan a barcode of a component to be installed within a system. As non-limiting examples, a component may comprise an input device, such as a sensor (e.g., a camera, a door sensor, motion detector, water detector, a smoke detector, etc.), an output device (e.g., a speaker, a display, a siren, or a light), a secondary control panel, or any combination thereof. More specifically, for example, a security system control panel may be configured to scan a barcode of a security system component, such as a sensor, to obtain component information. Component information may include description information, such as component type (e.g., a window sensor), brand, model, etc. Further, a user, who is scanning the component at the security system control panel, may enter a location at which the component is to be positioned within the security system. As an example, a user, in conjunction with scanning a door sensor component, may designate that the door sensor component is to be positioned in an upstairs bedroom. Accordingly, the component may be "registered" within the security system, a communication link may be established between the door sensor component and the security system, and the door sensor component may be positioned within the security system.

As another example, an automation control panel may be configured to scan a barcode of a component, such as a light, to obtain component information. Component information may include description information, such as component type (e.g., a motion sensor light), brand, model, etc. Further, a user, who is scanning the component at the automation control panel, may enter a location at which the component is to be positioned within the automation system. As an example, a user, in conjunction with scanning a motion sensor light component, may designate that the motion sensor light component is to be positioned outside and proximate the front door. Accordingly, the motion sensor light component may be "registered" within the automation system, a communication link may be established between the motion sensor light component and the automation system, and the motion sensor light component may be positioned within the automation system.

FIG. 1 illustrates a system 100, in accordance with an embodiment of the present invention. System 100 includes components 101, controller 102, monitoring system 103, and remote activation system 131. Communication links 104 (e.g., a combination of wired and wireless communication links) to couple components 101 with controller 102. Wired communication links can include circuit loops that are either detected as closed or open. In some embodiments, components 101 and controller 102 are located on the same premises, such as, for example, in the same residence or in the same building. Communication link 106 (e.g., a wired telephone connection, wired or wireless network connection, cellular connection, etc. or combination thereof) couples controller 102 with monitoring system 103.

Generally, components 101 may include any of a variety of automation or security system components. For example, components 101 may include different types of sensors, such as, for example, door and window sensors, motion sensors, glass break sensors, etc. Generally, controller 102 may be configured to monitor sensors for alarm conditions via communication links 104 and relay alarms to monitoring system 103 via communication link 106.

Controller 102 includes a sensor monitoring module 111, a user interface 112, and an alarm module 113. Sensor monitoring module 111 is configured to monitor the sensors among components 101. The sensors may sense and/or indicate a change in their physical surroundings (e.g., a normally closed connection becomes open, a signal indicating that the sound of breaking glass was detected, etc). A signal from one of the sensors, transmitted from components 101 to controller 102 over communication links 104, may indicate an unauthorized access. For example, a circuit connected to a door sensor can transition from closed to open (or at least to a resistance exceeding a pre-determined resistance threshold) indicating that a door has been opened. Additionally, or alternatively, motion sensor may send an electrical signal indicative of detected motion. Sensor monitoring module 111 may monitor communication links 104 for indications and signals sent from one or more sensors. Upon sensor monitoring module 111 receiving an indication or signal of a change in physical surroundings, sensor monitoring module 111 may send the indication or signal to alarm module 113. In some cases, alarm module 113 may treat a monitored indication or signal from a sensor as an alarm condition.

User interface 112 can include an input interface and an output interface. The input interface may include physical input interface or virtual input interface that includes one or more numeric key pads (e.g., for entering a disarm code), sensor activation buttons, physical duress buttons, etc. The input interface may include a condenser for receiving audio input and/or communicating with monitoring system 103. The output interface includes an output display device that displays system status, such as, for example, armed, disarmed, sensors/zones that have detected change in physical surroundings, etc. The output interface may also include a speaker that audibly outputs information similar to that displayed on the output display device. The speaker can also be used by monitoring system 103 to communicate with a user of controller 102

Figure 2:
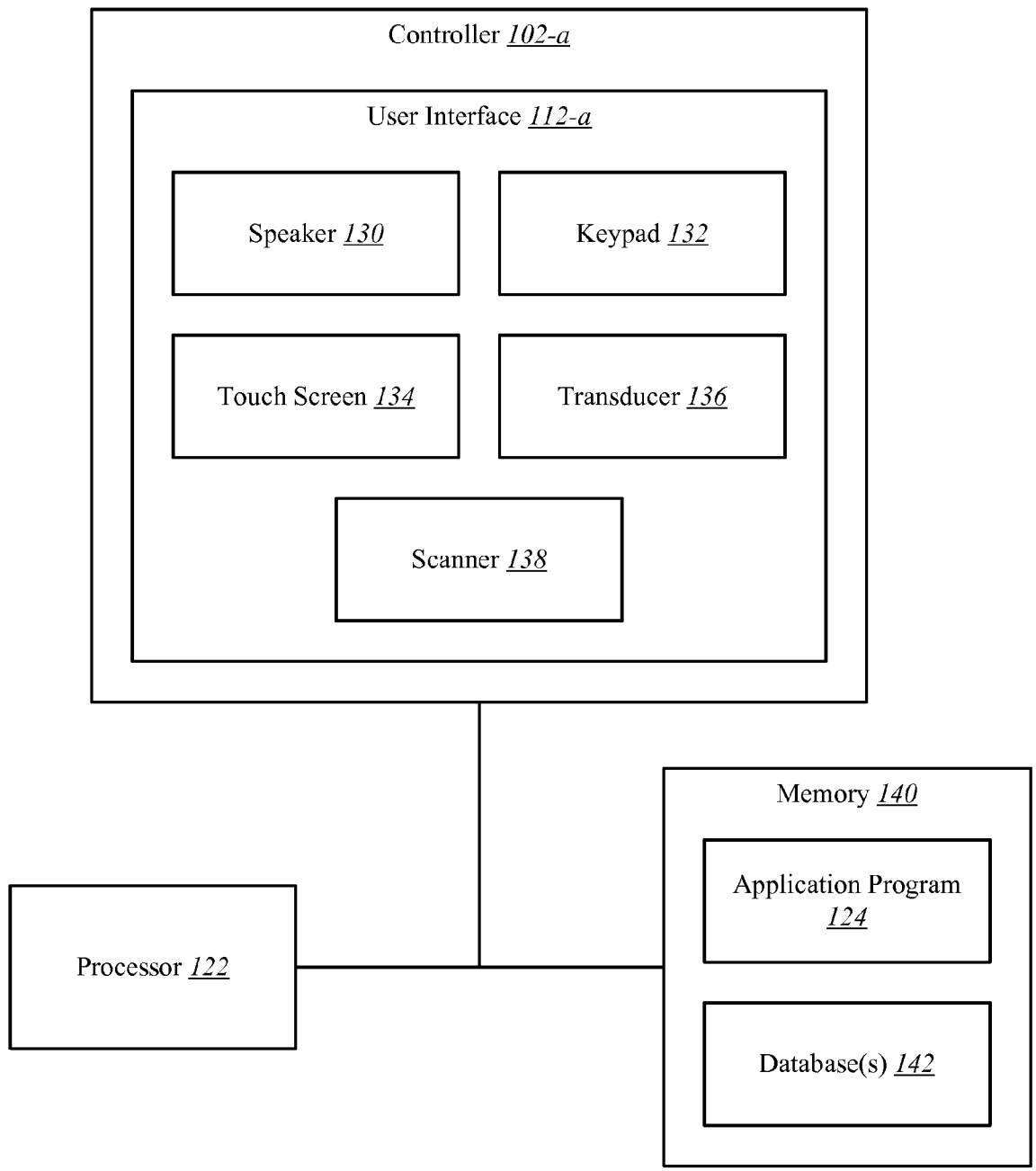
FIG. 2 is a block diagram of a controller of a system, in accordance with an embodiment of the present systems and methods.

FIG. 2 is a block diagram of controller 102-a. Controller 102-a may be one example of controller 102 from FIG. 1. Controller 102-a may include a user interface 112-a, which may be one example of user interface 112 from FIG. 1. User interface 112-a may include a speaker 130, a keypad 132, a touch screen 134, a transducer 136, and a scanner 138. By way of example only, scanner 138 may comprise a camera, a barcode reader, or a combination thereof.

In some embodiments, scanner 138 may be configured for reading a barcode to obtain information about an associated component. By way of example, the information may include component description information (e.g., component type, such as "glass break sensor," brand, model number, part number, etc). Further, the information may include specification information, such as, for example only, component size, whether the component is for indoor or outdoor use, whether the component has a battery backup, and any requirements and/or prerequisites for component use. As will be appreciated, a barcode may be positioned on a component, on component packaging, and/or on component materials, such as a component user manual.

Although scanner 138 is depicted as being part of controller 102-a, in some cases a component code may be scanned by a scanner external to controller 102-a. As one example, a component code may be scanned via a camera on a mobile computing device (e.g., smart phone, tablet computing device, laptop, etc.). For example, an application on the mobile computing device may include a scanning function that utilizes the camera on the mobile computing device to read the component code. The application may then communicate the information collected from scanning the component code to controller 102-a. Additionally, or alternatively, the mobile computing device may collect information entered and/or selected by the user via the mobile computing device as well as any computing device external to controller 102-a (e.g., a laptop computer, a desktop computer, etc.). For example, the mobile computing device may display a list of locations where the component may be installed, enabling the user to select the location via the mobile computing device. Accordingly, information collected at the mobile computing device may be communicated to controller 102-*a*. In some cases, a user may scan a component at controller 102-*a* via scanner 138. Scanning the component at the controller 102-*a* may register the component. Additional information may be received at controller 102-*a* via user interface 112-*a* and/or an external computing device, as described above.

In some cases, with the component scanned at controller 102-*a* and additional information received by controller 102-*a*, a user may scan the component in an area separate from controller 102-*a*. For example, controller 102-*a* may be located on the main level of a home, and the component may be designated as being installed in a basement room. In the basement, the user may scan the component using the camera on a mobile computing device to pull up information regarding where the component is to be installed, as well as additional information regarding the component (e.g., component identification information, component type information, component settings information, component specification information, component location information, etc.). Additionally, or alternatively, the user may be alerted that an installed component is failing and may need to be replaced. The user may scan the component code of the faulty component in order to pull up diagnostic information. In some cases, the diagnostic information acquired from scanning the component may enable the user to remedy the faulty component. On the other hand, upon determining the component needs replacing, the user may scan the component code of the faulty component in order to retrieve component information on the user's mobile computing device. For example, the user may indicate in an application on the mobile computing device that the component needs replacing. The application may then instruct the user to scan the component code of the faulty component, triggering a function to send information regarding the replacement of that type of component to the mobile computing device. The information sent to the mobile computing device may include component information stored in association with controller 102-*a* and/or information from a database such as information stored in cloud storage and/or on the Internet. In some cases, the information sent to the mobile computing device may include a set of instructions for replacement/installation. The user may scan the new component replacing the faulty component to register the new component with the system. Registering the new component with the system may automatically associate the new component with the component information previously collected and stored in relation to the faulty component. Thus, component identification information, component type information, component settings information, component specification information, component location information, etc., may be automatically associated with the new component.

Controller 102-*a* may further include a processor 122 as well as a memory 140 that, as depicted, may be coupled to user interface 112 and processor 122. Generally, controller 102-*a* may operate under control of an operating system stored in memory 140, and interface with a user to accept inputs and commands and to present outputs through user interface 112-*a*. Controller 102-*a* may also implement a compiler which allows an application program 124 written in a programming language to be translated into a machine code that is readable by processor 122. In one embodiment, instructions implementing application program 124 may be tangibly embodied in a computer-readable medium. Further, application program 124 may include instructions which, when read and executed by processor 122, may cause processor 122 to perform the steps necessary to implement and/or use embodiments of the present invention. Application program 124 and/or operating instructions may also be tangibly embodied in memory 140 and/or data communications devices, thereby making a computer program product or article of manufacture according to an embodiment. As such, the term "application program" as used herein is intended to encompass a computer program accessible from any computer readable device or media. Furthermore, portions of the application program may be distributed such that a portion of the application program may be included on a computer readable media within controller 102-*a* and a portion of the application program may included in a remote device, such as a remote computer within monitoring system 103 (see FIG. 1).

Memory 140 may further include one or more databases 142 for storing component information. More specifically, according to one embodiment, databases 142 may store information obtained upon scanning a component. Accordingly, databases 142 may include information pertaining to each component of an installed system. Furthermore, databases 142 may include pre-programmed information relating to known system components (i.e., components that are compatible with the associated system).

As will be appreciated by a person having ordinary skill in the art, a user may activate and control scanner 138 via user interface 112-*a*. Further, after activating scanner 138, the user may position a barcode on a component, such as a sensor, proximate a display of user interface 112-*a* to enable scanner 138 to scan the barcode and thereby obtain information about the component. Further, in conjunction with scanning a component, the user may enter a desired location for the component. It is noted that the user may enter the location prior to, after, or while scanning the component. As one example, after scanning the component, the user may be prompted via user interface 112-*a* to enter a location for the scanned component. More specifically, for example, the user may be prompted to select a location from a list of available locations. For example, a user may enter one or more locations via the user interface 112-*a* that may be stored in the one or more databases 142. Additionally, or alternatively, one or more locations may be stored in databases 142 prior to the user acquiring controller 102-*a*. Thus, the user may select one or more locations from a list including locations entered by the user and/or pre-programmed into the one or more databases 142. In some cases, after selecting a component installation mode, a user may select a location (i.e., by entering a valid location or selecting from a list of valid locations) and, thereafter, scan the component. According to one embodiment, the user may enter location information via transducer 136 (i.e., orally, spoken, etc.), touch screen 134, keypad 132, or any combination thereof.

Upon scanning a component and obtaining component information of the scanned component, controller 102-*a* may access information in databases 142 that may assist in an installation process. As an example, upon scanning a code of a component, controller 102-*a* may determine a component type, such as "glass break sensor," brand, model number, and a part number. Further, controller 102-*a*, using the obtained information, may access databases 142 to determine additional information about the component, such as whether the component is for indoor or outdoor use, whether the component has a battery backup, and any requirements for component use. Information obtained via a barcode and/or databases 142 may be displayed via user interface 112-*a*.

Upon scanning a component and receiving information regarding a designated location for a component, controller 102-a, via application program 140, may register (i.e., install) the component within the associated system. Upon registering the component, a communication link (e.g., wireless communication link) may be established between the component and controller 102-a. It is noted that information obtained via a barcode may be used by a remote processor and application program to register a component within a system. For example, according to one embodiment, monitoring system 103 (see FIG. 1) may be configured to evaluate component information obtained via a barcode to register the component within the system.

It is noted that a component may be installed within a system (e.g., a security system) while the system is being originally installed, to replace a component in a previously installed system, or to add a component to a previously installed system. For example, according to one embodiment, a system installer (e.g., technician), after installation of a control panel (i.e., controller 102-a), may install each component of the system via associated barcodes. For example, a system installer may select an installation mode at the control panel. The system installer may position each component to be installed near user interface 112-a to enable scanner 138 to scan the barcode on the component to allow controller 102-a to obtain information about the scanned component. It is noted that in response to scanning a component, a communication link may be established between the component and controller 102-a. After scanning each component, and identifying a desired location for each component, the system installer may then position each component in its identified location (e.g., in a bedroom, at a door, at a window, etc.).

As another example, a user, such as a home owner, may wish to replace a component within the previously installed system. For example, the user may wish to upgrade a component, or replace a malfunctioning component. The user may identify, via user interface 112-a, an installed component to be replaced (an "old component"). Further, the user may position a component to be installed (a "new component") near user interface 112-a to enable scanner 138 to read the barcode and obtain information about the component. After scanning the component, and identifying a desired location for the component, the user may remove the old component, replacing it with the new component, communicatively coupled to controller 102-a at its identified desired location.

In some cases, a user, such as a home owner, may wish to add a new component within a previously installed system. More specifically, for example, the user may wish to add an additional motion sensor to a previously installed and operable security system. According to this embodiment, the user may position a component to be installed (a "new component") near user interface 112-a to enable scanner 138 to read the barcode and obtain information about the component. Further, a communication link may be established between the scanned component and controller 102-a. After scanning the component, and identifying a desired location for the component, the user may remove the old component and replace it with the new component, which is communicatively coupled to controller 102-a at its identified desired location.

Figure 3:
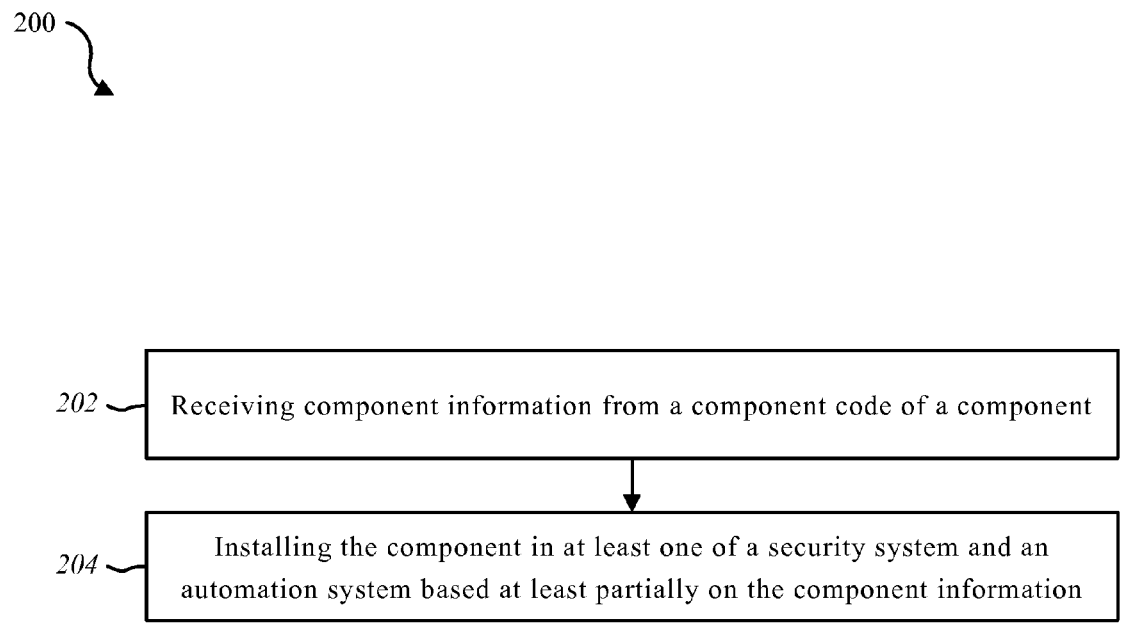
FIG. 3 is a flow chart illustrating a method, according to an embodiment of the present systems and methods.

FIG. 3 is a flowchart of a method 200, according to an embodiment of the present invention. At block 202, component information may be received from a component code of a component. For example only, a controller (e.g., controller 102) may receive the component information by scanning a barcode associated with a component, such as sensor. At block 204, the component may be installed in a system based at least partially on the component information. As an example, upon scanning the barcode, the controller may process the component information to install the component within the system, which may comprise a security system, an automation system, or a combination thereof.

Figure 4:
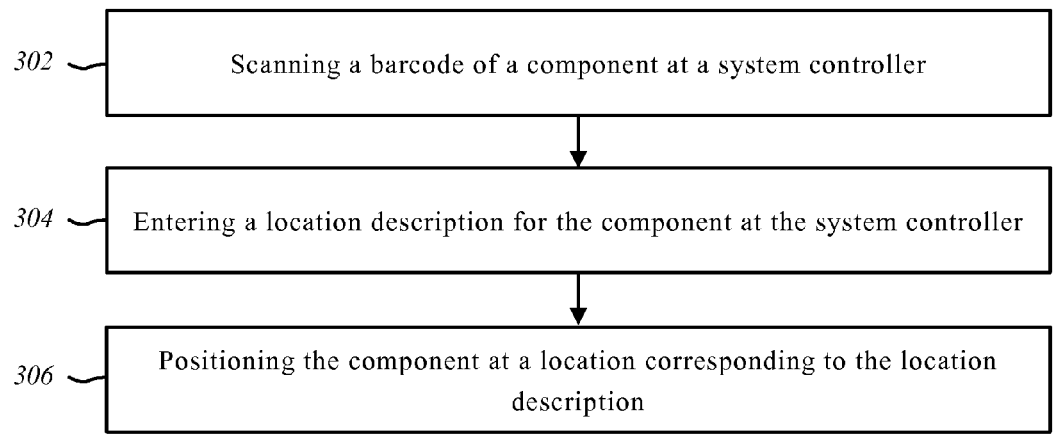
FIG. 4 is a flow chart illustrating another method, according to an exemplary embodiment of the present systems and methods.

FIG. 4 is a flowchart of another method 300, in accordance with an embodiment of the present invention. At block 302, a barcode of a component may be scanned at a system controller. At block 304, a location description for the component may be entered at the system controller. At block 306, the component may be positioned at a location corresponding to the location description.

Figure 5:
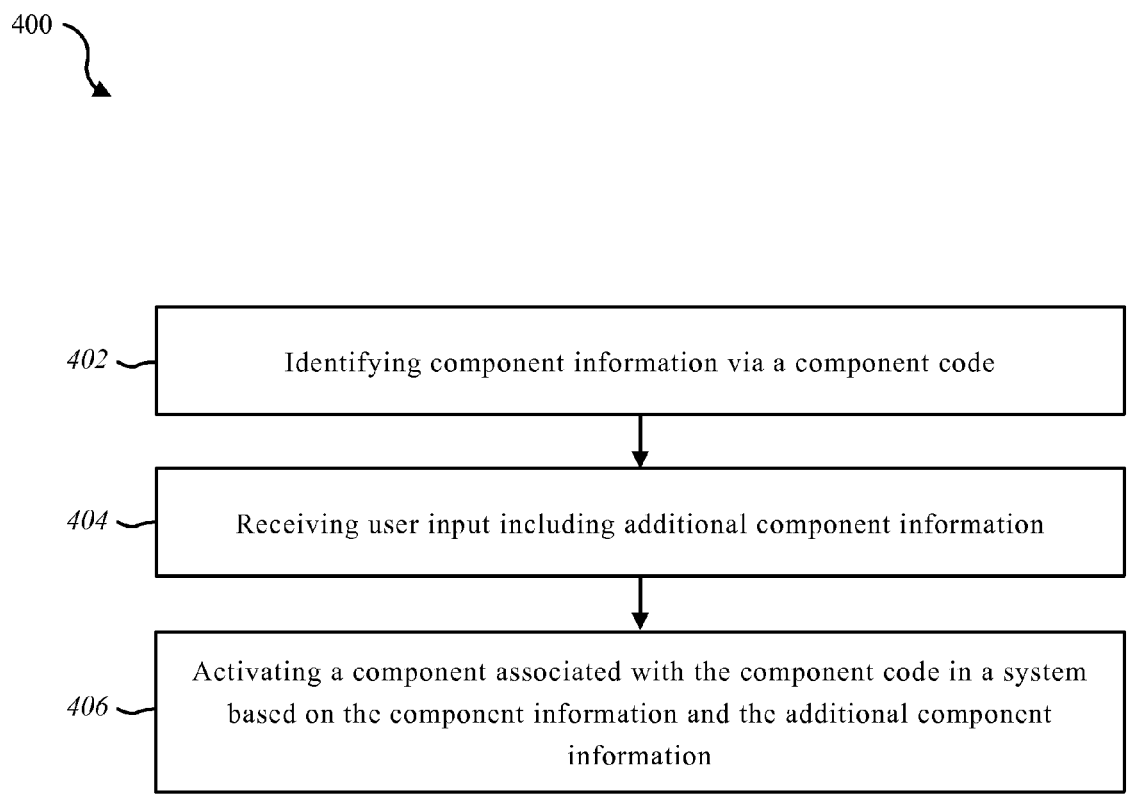
FIG. 5 is a flow chart illustrating another method, in accordance with an embodiment of the present systems and methods.

FIG. 5 is a flowchart of yet another method 400, in accordance with an embodiment of the present invention. At block 402, component information may be identified via a component code. At block 404, user input may be received including additional component information. At block 406, a component associated with the component code may be activated in a system based on the component information and the additional component information.

In contrast to conventional methods and devices, embodiments of the present invention may enhance a process of installing a component within a system. More specifically, in contrast to conventional systems, which require manually entering component information (e.g., a part and model number) via an input device, such as a keyboard, embodiments described herein may reduce, or possibly eliminate, a need to manually input component information via a keyboard. As a result, the installation time may be reduced and an installation process may be enhanced.

Although the foregoing description contains many specifics, these should not be construed as limiting the scope of the systems and methods described herein or of any of the appended claims, but merely as providing information pertinent to some specific embodiments that may fall within the scope of the systems and methods described herein and the appended claims. Features from different embodiments may be employed in combination. In addition, other embodiments of the embodiments may also be devised which lie within the scope of the systems and methods described herein and the appended claims. The scope of the systems and methods described herein is, therefore, indicated and limited only by the appended claims and their legal equivalents. All additions, deletions and modifications to the systems and methods described herein, as disclosed herein, that fall within the meaning and scope of the claims are to be embraced by the claims.

What is claimed is:

1. A computer-implemented method for installing a component within a system, the method comprising:
   identifying component information via a component code on a component;
   determining additional component information based at least in part on receiving user input and by accessing information associated with the component from a database, the additional component information including at least a component type associated with the component; and
   activating the component associated with the component code in a system based on the component information and the additional component information.

2. The method of claim 1, further comprising:
   scanning the component code to receive at least a portion of the component information.

3. The method of claim 2, wherein the component code is scanned via a scanner incorporated into a system controller.

4. The method of claim 2, wherein the component code is scanned via a camera on a mobile computing device.

5. The method of claim 1, further comprising:
receiving the additional component information via a system controller, wherein at least a portion of the additional component information is entered by a user at the system controller.

6. The method of claim 1, further comprising:
receiving the additional component information via a system controller, wherein at least a portion of the additional component information is sent to the system controller from a separate computing device.

7. The method of claim 1, further comprising:
storing at least a portion of the component information and the additional component information in a storage device; and
replacing a first component with a second component based on the stored component information.

8. The method of claim 1, further comprising:
identifying component location information from the additional component information.

9. The method of claim 1, further comprising:
displaying a list of available locations for the component; and
receiving a user selection from the list of available locations.

10. The method of claim 1, further comprising:
activating the component in a security system, an automation system, or a combination thereof.

11. The method of claim 1, wherein the component information comprises at least one of component identification information, component settings information, component specification information, and component location information.

12. A computing device configured for progressive profiling in a home automation system, comprising:
a processor;
memory in electronic communication with the processor;
instructions stored in the memory, the instructions being executable by the processor to:
identify component information via a component code on a component;
determine additional component information based at least in part on receiving user input and by accessing information associated with the component from a database, the additional component information including at least a component type associated with the component; and
activate the component associated with the component code in a system based on the component information and the additional component information.

13. The computing device of claim 12, wherein the instructions are executable by the processor to:
scan the component code to receive at least a portion of the component information.

14. The computing device of claim 12, wherein the instructions are executable by the processor to:
receive the additional component information via a system controller, wherein at least a portion of the additional component information is entered by a user at the system controller.

15. The computing device of claim 12, wherein the instructions are executable by the processor to:
receive the additional component information via a system controller, wherein at least a portion of the additional component information is sent to the system controller from a separate computing device.

16. The computing device of claim 12, wherein the instructions are executable by the processor to:
display a list of available locations for the component; and
receive a user selection from the list of available locations.

17. The computing device of claim 12, wherein the instructions are executable by the processor to:
store at least a portion of the component information and the additional component information in a storage device; and
replace a first component with a second component based on the stored component information.

18. The computing device of claim 12, wherein the component information comprises at least one of component identification information, component settings information, component specification information, and component location information.

19. A computer-program product for progressive profiling, by a processor, in a home automation system, the computer-program product comprising a non-transitory computer-readable medium storing instructions thereon, the instructions being executable by the processor to:
identify component information via a component code on a component;
determine additional component information based at least in part on receiving user input and by accessing information associated with the component from a database, the additional component information including at least a component type associated with the component; and
activate the component associated with the component code in a system based on the component information and the additional component information.

20. The computer-program product of claim 19, wherein the instructions are executable by the processor to:
scan the component code to receive at least a portion of the component information.

* * * * *